(12) United States Patent
Hasegawa et al.

(10) Patent No.: US 9,419,485 B2
(45) Date of Patent: Aug. 16, 2016

(54) COIL WIRE FOR ROTATING ELECTRICAL MACHINE AND COIL BODY

(71) Applicants: Ayako Hasegawa, Nagoya (JP); Hiroyuki Hattori, Okazaki (JP)

(72) Inventors: Ayako Hasegawa, Nagoya (JP); Hiroyuki Hattori, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 145 days.

(21) Appl. No.: 14/096,214

(22) Filed: Dec. 4, 2013

(65) Prior Publication Data

US 2014/0159538 A1 Jun. 12, 2014

(30) Foreign Application Priority Data

Dec. 6, 2012 (JP) .................................. 2012-267537

(51) Int. Cl.
| | |
|---|---|
| *H02K 3/34* | (2006.01) |
| *H02K 1/04* | (2006.01) |
| *H02K 3/40* | (2006.01) |
| *H02K 3/48* | (2006.01) |
| *H02K 3/14* | (2006.01) |

(52) U.S. Cl.
CPC . *H02K 3/14* (2013.01); *H02K 3/345* (2013.01)

(58) Field of Classification Search
CPC ............... H02K 3/34; H01B 3/04; H01F 5/02
USPC ................. 310/12.21, 43, 196, 200, 214, 215; 174/100
See application file for complete search history.

(56) References Cited

U.S. PATENT DOCUMENTS

| 3,723,797 A | * | 3/1973 | Andersson ............... H01B 3/04 174/117 FF |
| 2008/0007133 A1 | | 1/2008 | Onimaru et al. | |
| 2012/0092117 A1 | * | 4/2012 | Urano ..................... H02K 3/42 336/186 |

FOREIGN PATENT DOCUMENTS

| JP | 01161613 A | * | 6/1989 |
| JP | 2003-158840 A | | 5/2003 |
| JP | 2008-035687 A | | 2/2008 |
| JP | 2008193860 A | * | 8/2008 |
| JP | 2011188721 A | | 9/2011 |
| JP | 2012-146473 A | | 8/2012 |
| JP | 2013-093928 A | | 5/2013 |
| WO | 2012/049775 A1 | | 4/2012 |

* cited by examiner

*Primary Examiner* — Joshua Benitez-Rosario
*Assistant Examiner* — Jose Gonzalez Quinone
(74) *Attorney, Agent, or Firm* — Kenyon & Kenyon LLP

(57) ABSTRACT

A coil wire for a rotating electrical machine forms a coil body wound on teeth of a stator for the rotating electrical machine and includes an element wire assembly and a covering member. The element wire assembly has a plurality of element wires coated with insulation and bound together. The covering member is an electrical conductive member covering around the element wire assembly and provided with a conductive side surface and a slit. The conductive side surface is a surface with which magnetic flux from the teeth is linked when the coil wire is wound on the teeth. The slit is provided on the conductive side surface along a longitudinal direction of the coil wire, and the slit extends from an inner peripheral side to an outer peripheral side of the coil body in an coil end of the coil body.

3 Claims, 5 Drawing Sheets

COIL WIRE FOR ROTATING ELECTRICAL MACHINE AND COIL BODY

INCORPORATION BY REFERENCE

The disclosure of Japanese Patent Application No. 2012-267537 filed on Dec. 6, 2012 including the specification, drawings and abstract is incorporated herein by reference in its entirety.

BACKGROUND OF THE INVENTION

1. Field of the Invention

The present invention relates to a coil wire for a rotating electrical machine in which a covering member is covered around an element wire assembly formed by binding a plurality of element wires, and a coil body using the coil wire.

2. Description of Related Art

For example, PCT International Application Publication No. WO 2012/049775 discloses a conventional motor wire that is formed by winding a strip-shaped member in an outer peripheral surface of an assembled wire which is formed by binding a plurality of wires in a spiral form. The cited reference discloses that the strip-shaped member used in the motor wire is made of a metal, and the electrical resistance of the strip-shaped member is greater than or equal to that of the wire. The cited reference also discloses that the strip-shaped member allows the increase in durability of the motor wire when the motor wire is bent to form a coil, to keep a state where the plurality of wires are bound, and the reduction of generation of eddy current in the coil.

The motor wire disclosed in WO 2012/049775 has a structure such that the total length of the strip-shaped member elongates because the strip-shaped member that has relatively high electrical resistance is wound over the entire wire in the longitudinal direction in a spiral form. If the strip-shaped member elongates, then the length of path where the electric current flows elongates, and thus a resistance loss increases. Here, an eddy current loss means a power loss that occurs due to the flow of eddy current.

SUMMARY OF THE INVENTION

Furthermore, when the coil is formed by winding the metallic strip-shaped member around the assembled wire in a spiral form, circulating current can be generated in which the eddy current generated in the strip-shaped member positioned in a slot flows through the strip-shaped member positioned in a coil end.

The object of the present invention is to decrease the loss due to the eddy current in the coil wire, and to prevent the eddy current generated in the covering member positioned in the slot from flowing through the covering member in the coil end as the circulating current.

The coil wire for the rotating electrical machine according to a first aspect of the present invention includes the following structure. The coil wire forms a coil body wound on teeth of a stator for the rotating electrical machine and includes an element wire assembly and a covering member. The element wire assembly has a plurality of element wires coated with insulation and bound together. The covering member is an electrical conductive member covering around the element wire assembly and provided with a conductive side surface and a slit. The conductive side surface is a surface with which magnetic flux from the teeth is linked when the coil wire is wound on the teeth of the stator for the rotating electrical machine. The slit is provided on the conductive side surface along a longitudinal direction of the coil wire, and the slit extends from an inner peripheral side to an outer peripheral side of the coil body in an coil end of the coil body.

The coil wire according to a second aspect of the present invention includes the following structure. A coil body includes a coil wire, and the coil body is formed such that the coil wire is wound on teeth of a stator of a rotating electrical machine in a coil form. The coil wire includes an element wire assembly and a covering member. The element wire assembly has a plurality of element wires coated with insulation and bound together. The covering member is an electrical conductive member covering around the element wire assembly and provided with a conductive side surface and a slit. The conductive side surface is a surface with which magnetic flux from the teeth is linked when the coil wire is wound on the teeth of the stator for the rotating electrical machine. The slit is provided on the conductive side surface along a longitudinal direction of the coil wire, and the slit extends from an inner peripheral side to an outer peripheral side of the coil body in an coil end of the coil body or.

According to the coil wire for the rotating electrical machine and the coil body, the loss due to the eddy current in the coil wire can be decreased. Furthermore, the eddy current generated in the covering member positioned in the slot can be prevented from flowing through the covering member in the coil end as the circulating current.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments according to the present invention will be described in detail with reference to attached drawings. In this description, specific shapes, materials, values, and directions are merely examples in order to facilitate the understanding of the present invention and can appropriately be changed in accordance with their uses, purposes, and specifications. Furthermore, when the following descriptions include a plurality of embodiments and modifications, the inventors of this application originally intend to use the features in combination appropriately.

Figure 1:
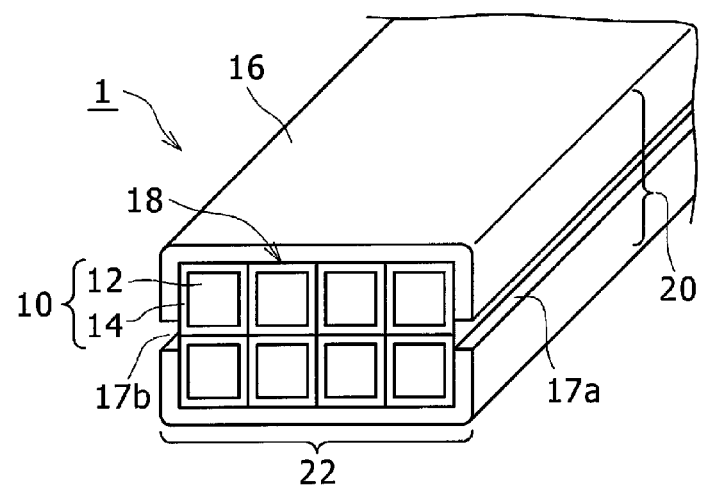
FIG. 1 is a perspective view that shows a rectangular wire that is an embodiment of the present invention.

Additionally, although rectangular wires that has a rectangular shape in cross section are exemplified as conductive wires for a motor hereinafter, the present invention is not limited to this, and the present invention is broadly applicable to the wires that have any polygonal or circular shapes in cross section FIG. 1 is a perspective view that shows a rectangular wire 1 that is an embodiment of the present invention. The wire is one example of a coil wire. As shown in the drawing, the rectangular wire 1 includes a plurality of element wires 10 and a covering member 16.

An element wire 10 is formed such that an insulation coating 14 is provided in an outer peripheral surface of a core wire 12. The core wire 12 is a conductor that is formed in a line of a metal, which has electrical conductivity, such as copper, aluminum, silver, gold, or an alloy thereof, for example. The insulation coating 14 is formed with an insulator such as an enamel resin or a metal oxide, for example.

As shown in FIG. 1, the rectangular wire 1 is formed by covering the outer peripheral surface of an element wire assembly 18 that is formed by binding a plurality of the element wires 10 with the covering member 16. The rectangular wire 1 according to the present embodiment is exemplified such that the element wire assembly 18 is formed by arranging a total of eight element wires 10 which includes two wires in the short-side direction and four wires in the long-side direction; however, the present invention is not limited to the aforementioned structure. In the present embodiment, the rectangular wire 1 is formed in a square or a rectangular in cross section that is enclosed with short side surfaces 20 and long side surfaces 22.

The covering member 16 is made of a metal foil material that has electrical conductivity, for example. More specifically, the covering member 16 is made of the metal foil material such as copper, aluminum, iron, or an alloy thereof, for example. The covering member 16 is brought into close contact with the outer peripheral surface of the element wire assembly 18 that is bound in a rectangular shape.

The covering member 16 is provided with slits 17 that extend along the longitudinal direction of the rectangular wire 1. More specifically, the slits 17 include a first slit 17a and a second slit 17b. The first slit 17a and the second slit 17b are formed in an approximate middle position of two short side surfaces 20 in the width direction. When the rectangular wire 1 is formed into a U-shaped conductor segment and a plurality of segments are coupled to form a coil body, the positions of the first and second slits 17a and 17b are turned over so as to be changed in a coil end. This will be described later.

As described above, the rectangular wire 1 can increase the proportion of a conductor section in its cross section because the outer peripheral surface of the element wire assembly 18 that is formed by binding the plurality of the element wires 10 is covered with the covering member 16 which is made of a metal foil material. Therefore, the present invention has advantages that the space factor can increase when the rectangular wire 1 is formed into a coil and arranged in the slot of a motor stator and motor efficiency can be improved.

Figure 2:
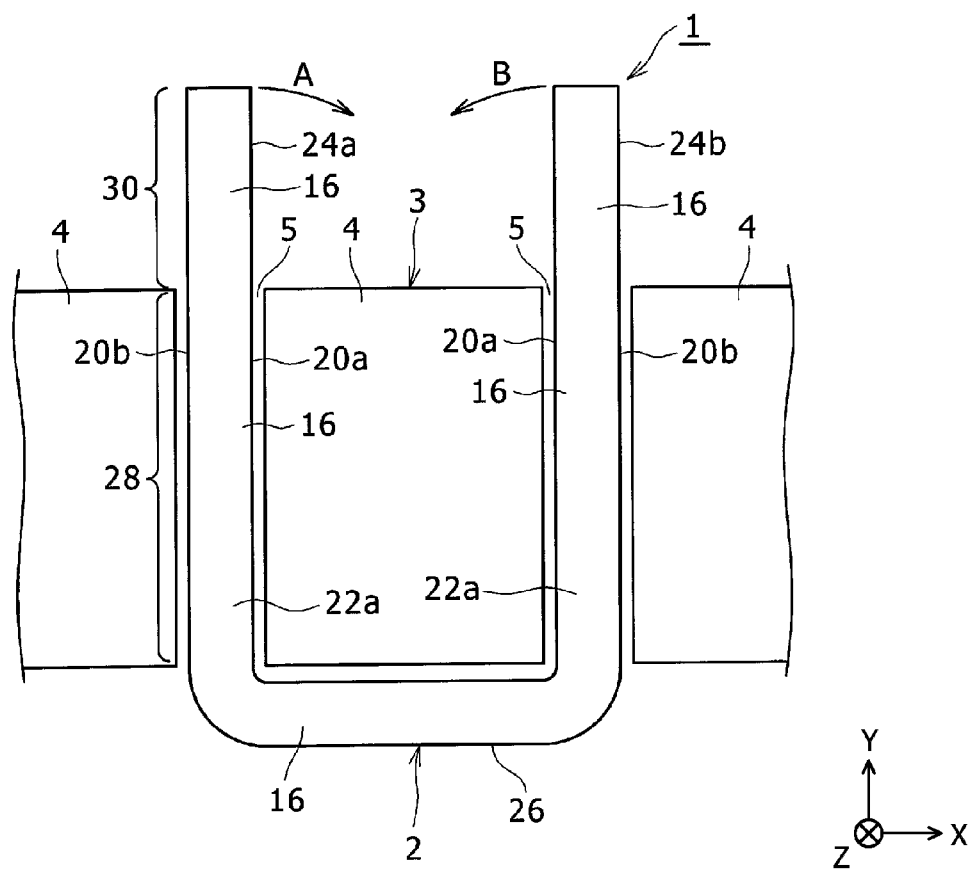
FIG. 2 is a diagram that shows an appearance when the rectangular wire in FIG. 1 is formed into a substantially U-shaped conductor segment and installed in a stator.
Figure 3:
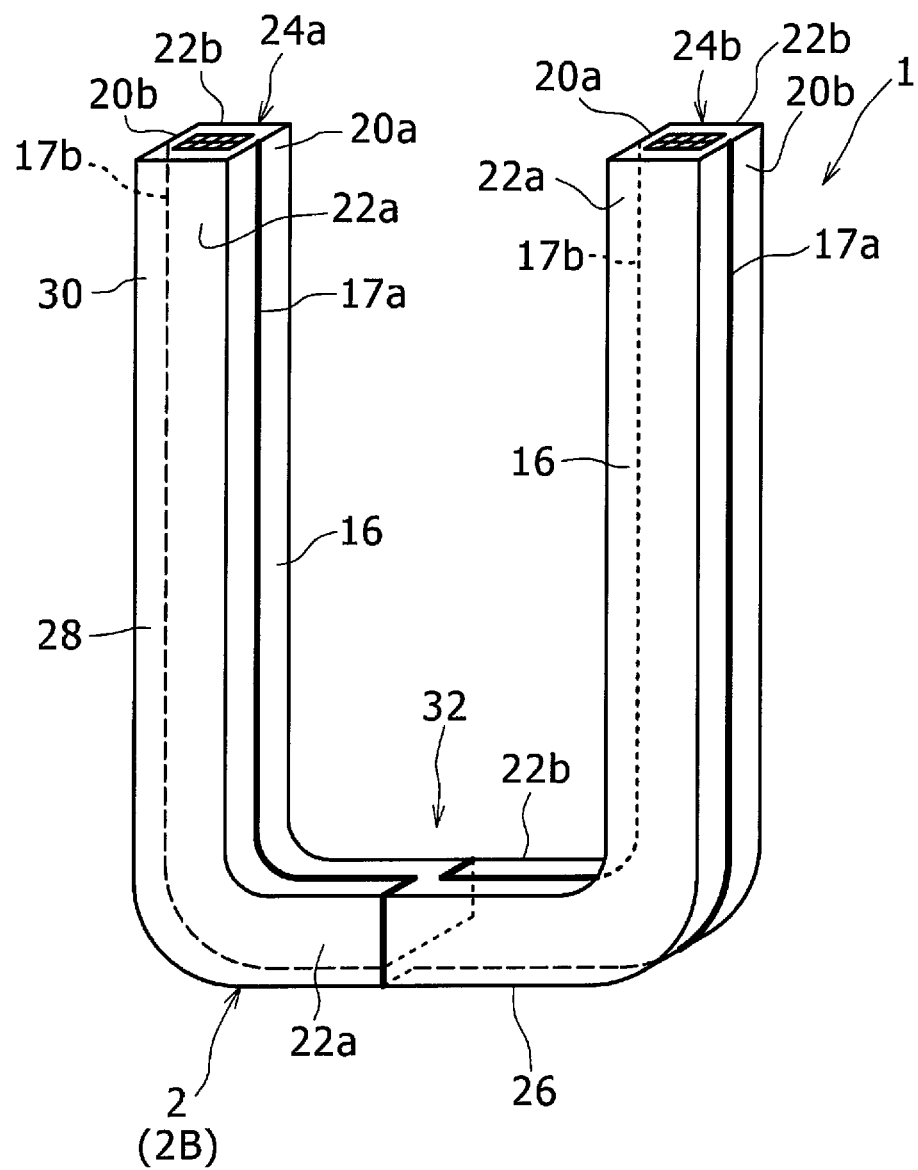
FIG. 3 is a perspective view of the conductor segment shown in FIG. 2.

FIG. 2 is a diagram that shows an appearance when the rectangular wire 1 in FIG. 1 is formed into a substantially U-shaped conductor segment 2 and installed in a motor stator 3. FIG. 3 is a perspective view that shows the conductor segment 2 in FIG. 2. FIG. 2 also shows a two-dimensional appearance of a part of the cylindrical motor stator 3 which is viewed from the inner peripheral side, teeth 4 that have rectangular end faces and project to radial inner sides, and slots 5 that are formed into groove-like recesses between the teeth 4.

As shown in FIG. 2, the rectangular wire 1 in the present embodiment is formed into the substantially U-shaped conductor segment 2 and installed in the motor stator 3. The conductor segment 2 includes two legs 24a and 24b that extend in parallel with each other and a connection part 26 that is connected between ends of the legs 24a and 24b (lower ends in FIG. 2). The conductor segment 2 can be formed by bending the rectangular wire 1 that is cut by a specified length.

The legs 24a and 24b of the conductor segment 2 include slot parts slot and tip parts 30. A slot part 28 is disposed inside the slot 5 when the legs 24a and 24b of the conductor segment 2 is inserted into and arranged within the slot 5 of the motor stator 3. On the other hand, a tip part 30 protrudes from the slot 5 of the motor stator 3 to the outside in a stator axial direction (Y-direction in FIG. 2) when the legs 24a and 24b of the conductor segment 2 is inserted into and arranged within the slot 5 of the motor stator 3, and the tip part 30 constitutes a coil end when the conductor segment 2 is formed as a coil. The connection part 26 of the conductor segment 2 is disposed on the other side in the axial direction and in the outside of the slot 5 of the motor stator 3 to constitute the coil end also when conductor segment 2 is formed as the coil.

In an example shown in FIG. 2, the legs 24a and 24b of the conductor segment 2 are inserted into and arranged within the adjacent slots 5 in the circumferential direction of the motor stator 3. However, the present invention is not limited to this structure, and the legs 24a and 24b may be inserted into and arranged within the slots 5 that are separated at every other one or more in the circumferential direction.

The tip part 30 of a first leg 24a of the conductor segment 2 is bent in the direction of an arrow A, and a second leg 24b is bent in the direction of an arrow B. That is to say, the tip parts 30 of the legs 24a and 24b are bent in the directions which the tip parts 30 approach each other. The tip part 30 of the first leg 24a described above is connected to the tip part of the bent second leg of another conductor segment (not shown), which is inserted into the slot 5 and arranged in the radial inner side (Z-direction in FIG. 2), through welding or crimping, for example. Additionally, the tip part 30 of the second leg 24b described above is connected to the tip part of the bent first leg of still another conductor segment (not shown), which is inserted into the slot 5 and arranged in the radial outer side (negative Z-direction in FIG. 2), through welding or crimping, for example.

A plurality of the conductor segments 2 are connected as described above, and thus a coil body is formed around the teeth 4 through the slots 5. The coil body in this case is wound such that two short side surfaces 20 of the rectangular wire 1 are formed as side surfaces on the inner peripheral side and the outer peripheral side and referred to as an edgewise coil.

Hereinafter, the inside of the coil is referred to as the inner peripheral side and the outside of the coil is referred to as the outer peripheral side when the plurality of the conductor segments 2 are connected in an approximate spiral to form the coil as described above.

As described above, the covering member 16 in the short side surface 20 of the rectangular wire 1 that constitutes the conductor segment 2 is provided with the first and second slits 17a and 17b. Referring to FIG. 3, the first slit 17a is formed at the approximate middle position of the short side surface 20a in the width direction on the inner peripheral side of the first leg 24a and extends from the first leg 24a to an approximate middle part of the connection part 26 along the longitudinal direction of the rectangular wire 1.

A direction changing portion 32 is provided in the approximate middle part of the connection part 26. The direction changing portion 32 is a part where the first slit 17a that is formed in the short side surface 20a on the inner peripheral side from the first leg 24a to the connection part 26 extends to the short side surface 20b on the outer peripheral side. More specifically, the first slit 17a is bent into an approximate 90° at the approximate middle part of the connection part 26, extends across one long side surface 22a to the approximate middle position of the short side surface 20b in the width direction on the outer peripheral side, is bent into the approximate 90° and extends along the longitudinal direction of the rectangular wire 1 from the approximate middle part of the connection part 26 to the tip part 30 of the second leg 24b in the short side surface 20b on the outer peripheral side.

On the other hand, the second slit 17b is formed at the approximate middle position of the short side surface 20b in the width direction on the outer peripheral side of the first leg 24a and extends from the first leg 24a to the approximate middle part of the connection part 26 along the longitudinal direction of the rectangular wire 1. The second slit 17b extends from the short side surface 20b on the outer peripheral side to the short side surface 20a on the inner peripheral side at the direction changing portion 32. More specifically, the second slit 17b is bent into an approximate 90° opposite to the first slit 17a at the approximate middle part of the connection part 26, extends across the other long side surface 22b to the approximate middle position of the short side surface 20a in the width direction on the inner peripheral side, is bent into the approximate 90° and extends along the longitudinal direction of the rectangular wire 1 from the approximate middle part of the connection part 26 to the tip part 30 of the second leg 24b in the short side surface 20a on the inner peripheral side.

The first and second slits 17a and 17b as described above can be joined by adhesion, bonding, pressure welding, or crimping of two approximately strip-shaped foil materials that become the covering member 16 along the longitudinal direction of the element wire assembly 18. However, the covering member 16 is not limited to the member that is formed by joining the foil material to the element wire assembly 18. A metallic tube material may be covered around the element wire assembly 18 to form the rectangular wire 1, and then the slits 17a and 17b may be formed through laser beam machining or cutting, for example.

The conductor segment 2 that has the structure described above can be produced as follows.

First, the plurality of element wires 10 are aligned and bound in two rows by four columns to form the element wire assembly 18. Then, a metallic foil material to be the covering member 16 is joined on the outer peripheral surface of the element wire assembly 18 by adhesion, for example. Two approximately strip-shaped foil materials are joined along the longitudinal direction while forming the slits 17a and 17b on the outer peripheral surface of the element wire assembly 18.

After the tube material in which the element wire assembly 18 is inserted is rolled and passed through a die (not shown) that is formed with specified dimensions, the rectangular wire 1 of which the cross section is formed into the rectangular shape with desired dimensions can be produced.

Then, the enamel resin, for example, is applied and baked on the outer peripheral surface of the rectangular wire 1 in order to secure the insulation property of the rectangular wire 1. Accordingly, the production of the rectangular wire 1 is finished.

The rectangular wire 1 is cut at specified lengths and bent in the approximate U-shape, and thus the conductor segment 2 is produced.

Figure 4:
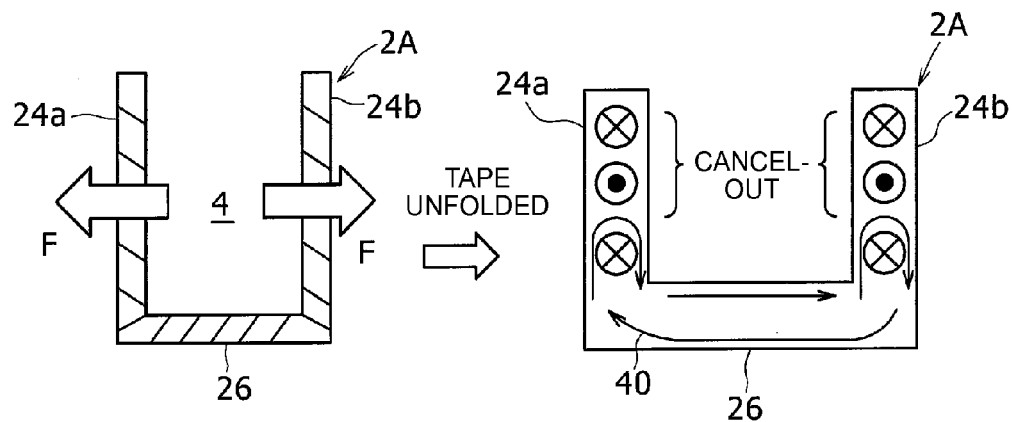
FIG. 4 is schematic diagrams that illustrate a manner in which the circulating currents flow through the coil end.

FIG. 4 is schematic diagrams that illustrate a manner in which circulating currents flow through the coil end. As shown in the drawing on the left side of FIG. 4, it is considered in a case where the coil is constructed with a conductor segment 2A that is formed with the rectangular wire in which a conductive metallic tape is wound in a spiral form around the element wire assembly 18.

In this case, when a magnetic flux F that is generated from the teeth 4 of the motor stator 3 is linked with in-slot portions 28 of the legs 24a and 24b of the conductor segment 2A, the magnetic flux F flows from the inner peripheral side to the outer peripheral side in the legs 24a and 24b for the linkage. Thus, the magnetic flux F passes in the direction from a front side to a back side of the metallic tape in the short side surface 20a on the inner peripheral side, and the magnetic flux F passes in the direction from the back side to the front side of the metallic tape in the short side surface 20b on the outer peripheral side.

Then, as shown in the drawing on the right side of FIG. 4 that schematically shows a state in which the metallic tape is unfolded, eddy currents flow in the opposite directions to each other in one winding of the metallic tape in a spiral form to cancel out each other at a part that is positioned in the short side surface on the inner peripheral side and a part that is positioned in an end side surface on the outer peripheral surface.

However, depending on the number of windings of the metallic tape in the in-slot portions 28 of the legs 24a and 24b described above, the cancel-out relation as described above may be an imperfect relation. For example, the number of windings of the metallic tape corresponding to the in-slot portion 28 differs between the short side surface 20a on the inner peripheral side and the short side surface 20b on the outer peripheral side, and thus the eddy current that is not cancelled out remains. The eddy current is assumed to generate at a tape portion in an end on a side of the connection part 26 of each of the legs 24a and 24b. Then, two eddy currents become the circulating currents 40 that flow together through the metallic tape in the connection part 26, and result in eddy-current losses.

In response to this, the conductor segment 2 constructed with the rectangular wire 1 according to the present embodiment is formed, as described above, such that the first slit 17a is formed in the short side surface 20a on the inner peripheral side from the first leg 24a to the direction changing portion 32 of the connection part 26 and in the short side surface 20b on the outer peripheral side from the direction changing portion 32 to the second leg 24b. Whereas, the second slit 17b is formed in the short side surface 20b on the outer peripheral side from the first leg 24a to the direction changing portion 32 of the connection part 26 and in the short side surface 20a on the inner peripheral side from the direction changing portion 32 to the second leg 24b.

Because the slits 17a and 17b are formed as described above, the covering member 16 that is positioned in the in-slot portion 28 of each of the legs 24a and 24b has the relation in which the part positioned on the inner peripheral side in the first leg 24a is electrically continuous with the part positioned on the outer peripheral side in the second leg 24b, and the part positioned on the outer peripheral side in the first leg 24a is electrically continuous with the part positioned on the inner peripheral side in the second leg 24b. Consequently, the eddy current is cancelled out between the covering member 16 of the first leg 24a and that of the second leg 24b. As a result, the circulating current is not generated in the connection part 26 constituting the coil end, and thus the eddy-current loss can be suppressed. That is to say, the circulating current arising from the eddy current is not generated in the connection part 26 constituting the coil end due to the difference in the number of windings of the metallic tape in the legs 24a and 24b between the short side surface on the inner peripheral side and the short side surface on the outer peripheral side, and thus the eddy-current loss can be suppressed.

When the conductor segment 2 formed with the rectangular wire 1 according to the present embodiment is used to form the coil, the slits 17a and 17b are formed at the approximate middle position of the short side surfaces 20a and 20b on both sides of the legs 24a and 24b in the circumferential directions, and the linkage area of the magnetic flux F from the teeth 4 with the electrically conductive covering member 16 is decreased. Accordingly, the generation of the eddy currents in the covering member 16 can be reduced.

Furthermore, when the conductor segment 2 formed with the rectangular wire 1 according to the present embodiment is used to form the coil, the length of current path flowing through the covering member 16 can be shortened in comparison with a case where the covering member is formed by winding the metallic tape in a spiral form throughout the length of the rectangular wire, and the electrical resistance can accordingly be suppressed in low.

The above descriptions are made such that the electrically conductive covering member 16 is made of the metallic foil material; however, a case where the electrically conductive covering member 16 is made of a plurality of metallic plates is described with reference to FIGS. 5 through 8 next. The following embodiment exemplifies a structure in which the covering member is made of two plates; however, the present invention is not limited to this structure and may be formed with four plates, for example. When the slits are transferred into 180° in the circumferential direction of the wire, the same effects can be obtained.

Hereinafter, a case where the coil wire 1B is formed as the conductor segment 2B is described. Thus, the same or similar components of the conductor segment 2 described above are denoted with the same or similar reference numerals and symbols, and the descriptions thereof are not repeated herein.

Figure 5:
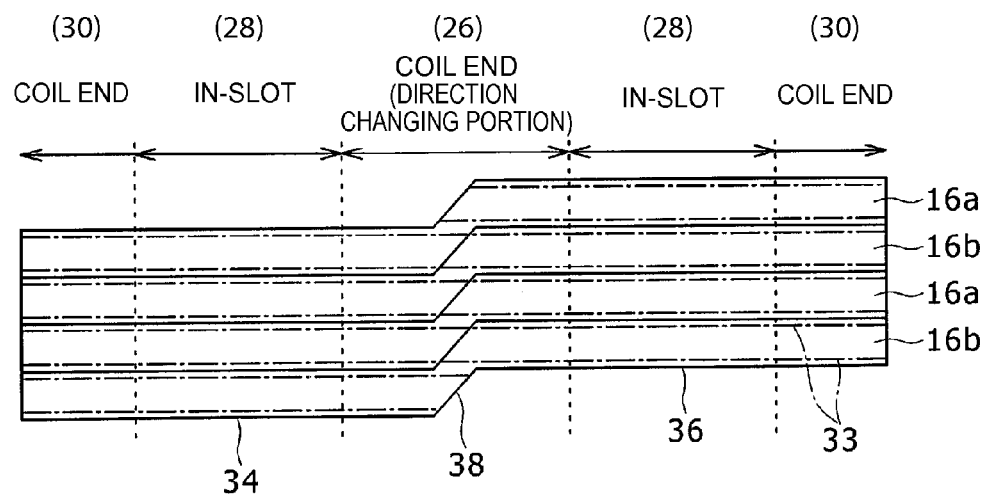
FIG. 5 is a plan view that shows plates which form the covering member.

FIG. 5 is a plan view that shows the metallic plates 16a and 16b which form the covering member 16. The covering member 16 of one conductor segment 2B is formed with two metallic plates 16a and 16b. In FIG. 5, the plates 16a and 16b are shown with bending lines 33 by alternate long and short dash lines. The bending lines 33 indicate the positions in which the plates 16a and 16b are bent along the corners extending in the longitudinal directions of the element wire assembly 18B when the plate materials 16a and 16b are assembled into the element wire assembly 18B.

The plates 16a and 16b can be stamped out of one large metal plate (such as a cooper plate, an aluminum plate, an iron plate, or an alloy plate thereof, for example) by stamping. Thus, a number of plates 16a and 16b can be formed by simultaneously stamping out a number of the plates in a juxtaposed state as shown in FIG. 5, and the plates 16a and 16b can be produced with the improved yield of the material and at low cost. Furthermore, processing and assembly are easier than the case where the tube material is formed into the covering member by machining the slit. In this point, the present embodiment has an advantage in the reduction of manufacturing cost.

Two plates 16a and 16b are identical in shape. That is to say, the plates 16a and 16b have the shape in which end side parts 34 and 36, which are shaped in an elongated rectangular and extend in parallel with each other, are connected with crank parts 38 that are positioned at the middle of the plates 16a and 16b in the longitudinal direction.

The crank part 38 diagonally extends to one end side part 34 (in 45°, for example) and is connected to the other end side part 36. When such crank part 38 is provided and assembled into the element wire assembly 18B described later, one end side part 34 and the other end side part 36 are arranged in the side surface on the opposite side of the element wire assembly 18B.

The crank part 38 may be bent in the direction that is orthogonal to the end side parts 34 and 36 so as to be formed into a slit shape as described above in regard to the covering member 16 of the conductor segment 2. The crank part 38 may be foamed with smaller width than the end side parts 34 and 36 as shown in the drawing or the same width.

Figure 6:
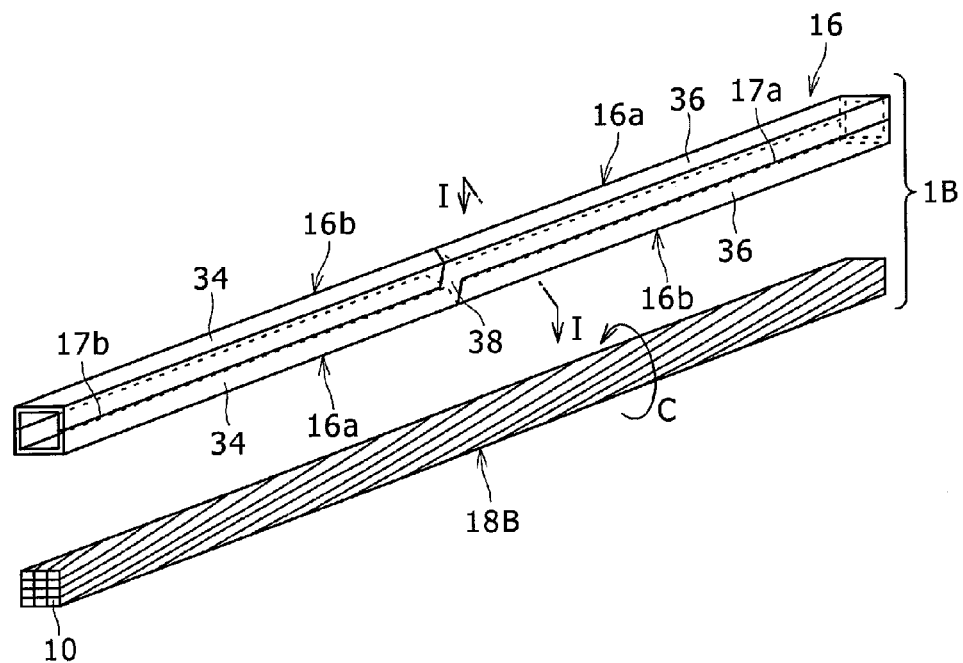
FIG. 6 is perspective views that separately show the covering member which is formed into an approximate tube shape by using two plates shown in FIG. 5 and the element wire assembly which is covered with the covering member.

FIG. 6 is a perspective view (upper drawing) that shows a state where two plates 16a and 16b are bent and formed into an approximate tube shape and a perspective view (lower drawing) of the element wire assembly 18B that is formed as a stranded wire. FIG. 6 separately shows the covering member 16 that is formed into the approximate tube shape by using two plates 16a and 16b of those shown in FIG. 5 and the element wire assembly 18B that is covered with the covering member 16.

The element wire assembly 18B is formed such that the plurality of element wires 10 are bound and stranded in the specified direction. More specifically, in the element wire assembly 18B, nine element wires 10 are bound in 3 rows by 3 columns to have the approximate square cross section and stranded in the direction of an arrow C. By being formed as such a stranded wire, the element wires 10 that form the element wire assembly 18B are firmly tied together and hardly spread out, and thus the present invention has an advantage in that the circulating current between the element wires can be cancelled out. However, the structure of the element wire assembly is not limited to the above structure, and the element wires 10 may be kept extending linearly as the element wire assembly 18 described above without being stranded.

Two plates 16a and 16b described above are assembled around the element wire assembly 18B of such stranded wires as follows. First, two plates 16a and 16b are arranged on both sides of the element wire assembly 18B so as to interpose the element wire assembly 18B therebetween.

Then, with a press die (not shown), while the crank part 38 is pressed against a lateral side surface of the element wire assembly 18B, the end side part 36 of the plate 16a and the end side part 34 of the plate 16b are bent while bringing into contact with an upper surface of the element wire assembly 18B, and an end edge is bent to the lateral side surface of the element wire assembly 18B along the bending line 33. Additionally, the end side part 34 of the plate 16a and the end side part 36 of the plate material 16b are bent while bringing into contact with a lower surface of the element wire assembly 18B, and the end edge is bent to the lateral side surface of the element wire assembly 18B along the bending line 33. The insulation coating is formed with the enamel resin, for example, on the outer periphery of two plates s 16a and 16b wrapped around the element wire assembly 18B to constitute the coil wire 1B. Then, the conductor segment 2B is formed by bending the coil wire 1B into a U-shape.

Figure 7:
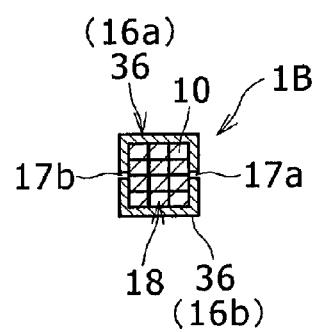
FIG. 7 is a cross-sectional view of the coil wire that is covered with the covering member which is formed by two plates.

FIG. 7 is a cross-sectional view that is taken along the line I-I in FIG. 6 and shows a state where the element wire assembly 18B is covered with the covering member 16. As shown in FIG. 7, the first and second slits 17a and 17b are formed between the end edges on the both sides of the plates 16a and 16b. The first and second slits 17a and 17b are formed so as to extend from the inner peripheral side to the outer peripheral side in the coil end of the coil body or vice versa when the conductor segment 2B is formed as the coil body as described above.

The coil body that is constituted by the conductor segment 2B formed as described above can provide the same functional effects as described above. That is to say, two plates 16a and 16b that constitute the covering member 16 positioned in the in-slot portion 28 of the legs 24a and 24b have the relation in which the part positioned on the inner peripheral side in the first leg 24a is electrically continuous with the part positioned on the outer peripheral side in the second leg 24b, and the part positioned on the outer peripheral side in the first leg 24a is electrically continuous with the part positioned on the inner peripheral side in the second leg 24b. Thus, the eddy current is cancelled out between the end side part 34 of the plates 16a and 16b positioned in the first leg 24a and the end side part 36 of the plates 16a and 16b positioned in the second leg 24b. As a result, the eddy current generated in the legs 24a and 24b can be reduced or prevented from flowing as the circulating current through the covering member of the connection part 26 constituting the coil end, and the eddy-current loss can be suppressed.

When the conductor segment 2 is used to form the coil, the slits 17a and 17b are formed at the approximate middle position of the short side surfaces 20a and 20b on both sides of the legs 24a and 24b in the circumferential directions, and the linkage area of the magnetic flux F from the teeth 4 with the electrically conductive covering member 16 is decreased. Accordingly, the generation of the eddy currents in the covering member 16 can be reduced.

Furthermore, when the conductor segment 2B is used to form the coil, the length of current path flowing through the covering member 16 can be shortened in comparison with a case where the covering member is formed by winding the metallic tape in a spiral form throughout the length of the coil wire, and the electrical resistance can accordingly be suppressed in low.

In the conductor segment 2B that is formed by the coil wire 1B, the covering member 16 is formed by two metallic plates 16a and 16b that are bent. The metallic plates 16a and 16b have higher strength and stiffness than the metallic tapes or foil materials and can provide large and stable binding forces with respect to the element wire assembly 18. Thus, the present embodiment can effectively prevent the element wires 10 from spreading out when the element wires 10 are formed as the U-shaped conductor segment or the coil.

Furthermore, when the covering member 16 is tried to be formed with one metallic tube material, the element wires 10 housed inside may be damaged in a case where first and second slits 17a and 17b are formed after the element wire assembly 18 is inserted and arranged in the tube material. Thus, the insulation property may decrease, and the cost of processing the slit while the tube material is rotated one by one may also increase. When the element wire assembly 18 is inserted from an end to the metallic tube material that is formed with the first and second slits 17a and 17b, the end of the element wire 10 may be caught in the slit in the direction changing portion 32 and hardly inserted into the metallic tube material, and the insulation coating of the element wire 10 may be damaged by rubbing against an inner peripheral edge of the end of the tube material. On the other hand, the coil wire 1B described above includes two plates 16a and 16b constituting the covering member 16 that hold the element wire assembly 18B from the both sides and are bent and attached onto the element wire assembly 18B, and thus the plates 16a and 16b can easily be attached and may not damage the element wires 10 constituting the element wire assembly 18B.

The insulating treatments such as forming of an oxide film may be applied on an inner surface of the plates 16a and 16b, that is, the surface that contacts with the element wire assembly 18B to prevent the eddy current from generating. Furthermore, the insulation coating such as an oxide film may be formed on an outer surface of the plates 16a and 16b to secure the insulation property between the coil wires even when the insulation coating made of the enamel resin on the outermost layer is damaged.

Figure 8A:
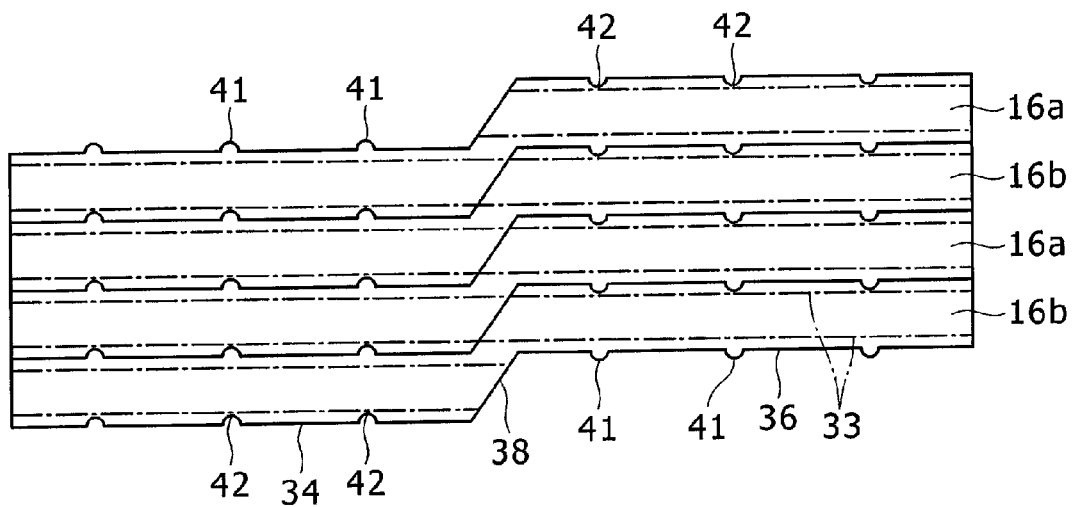
FIGS. 8A and 8B are plan views that show examples in which a protrusion and a recess fitted with each other are provided in the end edges of two plates in the width direction, and correspond to FIG. 5.
Figure 8B:
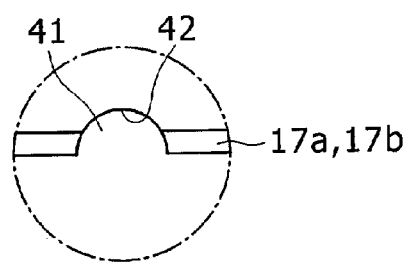

As shown in FIG. 8A, a plurality of approximate semi-circular protrusions 41 may be formed in one end edge of the plates 16a and 16b in the width direction, and a plurality of approximate semi-circular recesses 42 may be formed in the other end edge. When two plates 16a and 16b are assembled into the element wire assembly 18B, a part of the protrusions 41 may be fitted into the recesses 42 through the slits 17a and 17b, as shown in FIG. 8B. Accordingly, because the connecting strength between two plates 16a and 16b increases, the element wires 10 constituting the element wire assembly 18 can be kept firmly bound without spreading out during bending when the element wires 10 are formed into the conductor segment and the coil.

Furthermore, the plates 16a and 16b may be applied with an adhesive agent in the inner surfaces and attached to the element wire assembly 18B. Accordingly, the joining strength between the plates 16a and 16b, and the element wire assembly 18B increases, and the element wires 10 can be effectively bound.

Furthermore, the first and second slits 17a and 17b may be connected by spot-welding at the ends in the longitudinal direction after two plates 16a and 16b are assembled into the element wire assembly 18B. Accordingly, the connecting strength between two plates 16a and 16b increases greatly, and thus the element wire assembly 18 can be kept bound without spreading out.

Incidentally, the coil wire for the rotating electrical machine according to the present invention is not limited to the embodiments described above or modifications, and various alterations or improvements can be made within the scope of the matters described in the claims of this application and the range of equivalency of the claims.

For example, the rectangular wire 1 is formed as the U-shaped conductor segment, and the plurality of conductor segments are connected by welding, for example, to form the coil in the above descriptions. However, the present invention is not limited to the above structure, and the coil may be formed by winding the coil wires on the teeth or bobbins in a coil form in a state where the coil wires in which the in-slot portions are formed at specified spaces are connected to each other.

Furthermore, the above descriptions are made for an example in which the slits are formed in the short side surfaces of the rectangular wire that has a rectangular cross section to form an edgewise coil; however, the slits may be formed in two long side surfaces, and the long side surfaces may be provided as the inner peripheral side and the outer peripheral side of the coil.

Additionally, the slits may be filled with an insulating adhesive agent. Accordingly, the strength of the covering member in the slits increases, the joining strength of the element wire assembly increases, and the spreading out of the element wires can effectively be prevented.

What is claimed is:

1. A coil wire for a rotating electrical machine, comprising:
an element wire assembly having a plurality of element wires coated with insulation and bound together; and
a covering member covering around the element wire assembly, wherein
the covering member is provided with a conductive side surface with which a magnetic flux from teeth of a stator for the rotating electrical machine is linked when the coil wire is wound on the teeth, and wherein the covering member is an electrical conductive member,
a slit is provided on the covering member along a longitudinal direction of the coil wire,
the slit extends from an inner peripheral side surface to an outer peripheral side surface, or from the outer peripheral side surface to the inner peripheral side surface, of a coil body in a coil end of the coil body, the coil body being formed by the coil wire,
the coil wire is formed as a substantially U-shaped conductor segment including two legs, and a connection part connected between one end of each of the two legs such that the connection part and the one end of each of the two legs are continuous,
the coil end includes the connection part, the one end of each of the two legs,
the slit includes a first slit and a second slit,
the first slit extends from the other end of one of the two legs to the coil end in the inner peripheral side surface, the first slit extends to the outer peripheral side surface in the coil end, and the first slit extends in the outer peripheral side surface in the other of the two legs, and
the second slit extends from the other end of one of the two legs to the coil end in the outer peripheral side surface, the second slit extends to the inner peripheral side surface in the coil end, and the second slit extends in the inner peripheral side surface in the other of the two legs.

2. The coil wire for a rotating electrical machine according to claim 1, wherein
the covering member is formed of a plurality of metallic plates,
each plate includes a crank part that corresponds to a part where the slit extends from the inner peripheral side surface to the outer peripheral side surface, or from the outer peripheral side surface to the inner peripheral side surface, of the coil body in the coil end, and
the slit is provided between end edges of the plurality of plates by holding the element wire assembly with the plurality of plates and bending the plurality of plates around the element wire assembly.

3. A coil body comprising:
a coil wire, wherein
the coil body is formed such that the coil wire is wound on teeth of a stator of a rotating electrical machine, and
the coil wire comprises:
an element wire assembly having a plurality of element wires coated with insulation and bound together; and
a covering member covering around the element wire assembly, the covering member being provided with a conductive side surface with which a magnetic flux from the teeth is linked when the coil wire is wound on the teeth, wherein the covering member is an electrical conductive member; and
a slit being provided on the covering member along a longitudinal direction of the coil wire, the slit extending from an inner peripheral side surface to an outer peripheral side surface, or from the outer peripheral side surface to the inner peripheral side surface, of the coil body in a coil end of the coil body, wherein
the coil wire is formed as a substantially U-shaped conductor segment including two legs, and a connection part connected between one end of each of the two legs such that the connection part and the one end of each of the two legs are continuous,
the coil end includes the connection part, the one end of each of the two legs,
the slit includes a first slit and a second slit,
the first slit extends from the other end of one of the two legs to the coil end in the inner peripheral side surface, the first slit extends to the outer peripheral side surface in the coil end, and the first slit extends in the outer peripheral side surface in the other of the two legs, and
the second slit extends from the other end of one of the two legs to the coil end in the outer peripheral side surface, the second slit extends to the inner peripheral side surface in the coil end, and the second slit extends in the inner peripheral side surface in the other of the two legs.

* * * * *